March 29, 1927.

H. E. ORTHMAN 1,622,968

CULTIVATOR

Filed July 27, 1926

INVENTOR.
Herman E. Orthman,
BY
Geo. P. Kimmel
ATTORNEY.

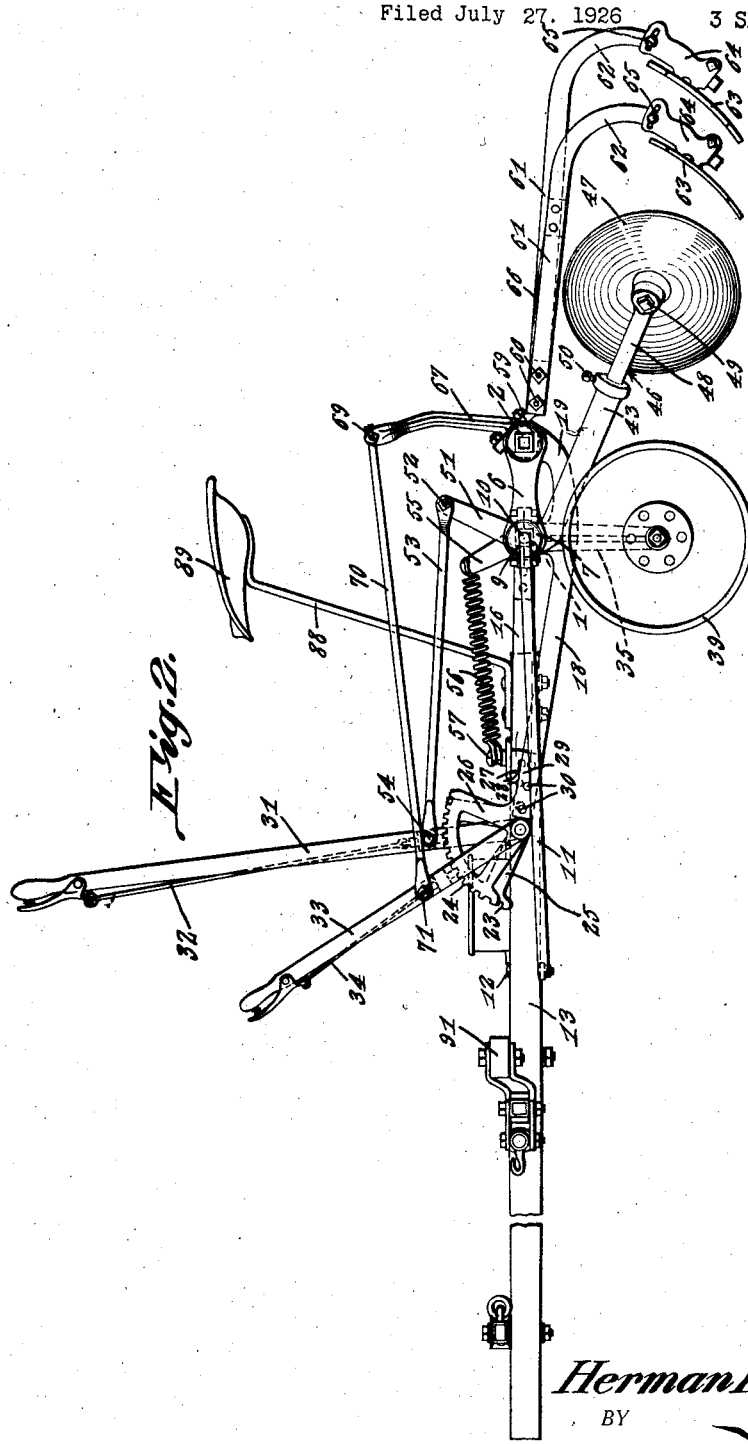

March 29, 1927.
H. E. ORTHMAN
CULTIVATOR
Filed July 27. 1926
1,622,968
3 Sheets-Sheet 3
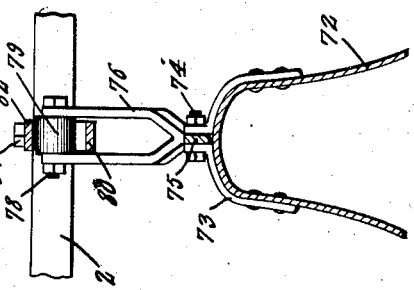
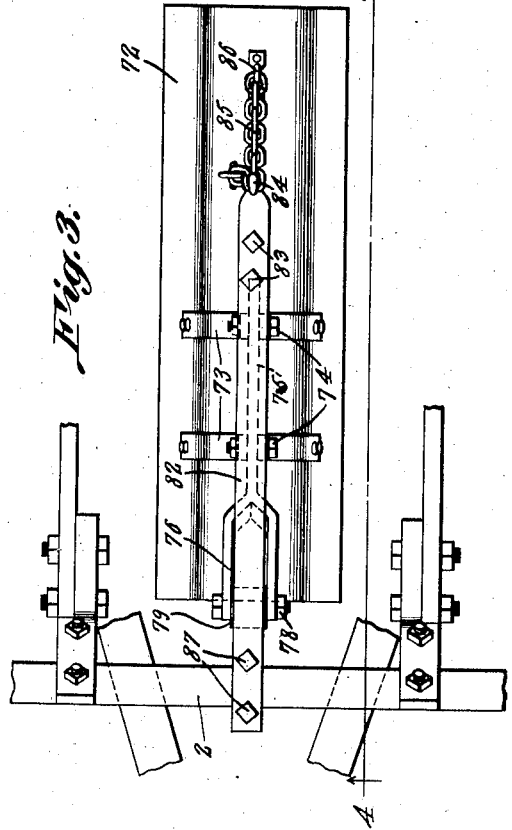
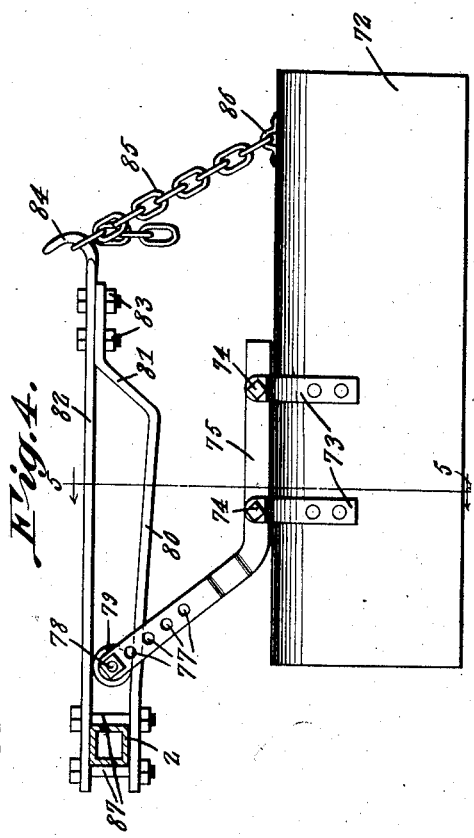
INVENTOR.
Herman E. Orthman,
BY
Geo. P. Kimmel  ATTORNEY.

Patented Mar. 29, 1927.

1,622,968

UNITED STATES PATENT OFFICE.

HERMAN E. ORTHMAN, OF LEXINGTON, NEBRASKA.

CULTIVATOR.

Application filed July 27, 1926. Serial No. 125,231.

This invention relates to cultivators, and has for its object to provide, in a manner as hereinafter set forth, a one unit two row lister cultivator for following a two row lister cultivator for following from the time the corn is up until it is forty inches high and acting during the operation of cultivation first to throw the dirt out, second to throw the dirt in and finally to ridge the dirt up in laying the corn by.

Further objects of the invention are to provide, in a manner as hereinafter set forth a one unit two row lister cultivator which is comparatively simple in its construction and arrangement, strong, durable, adjustable, thoroughly efficient and convenient in its use, readily assembled, and comparatively inexpensive to manufacture.

With the foregoing and other objects in view the invention consists of the novel construction, combination and arrangement of parts are hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a side elevation thereof.

Figure 3 is a fragmentary view, in top plan, illustrating a shield.

Figure 4 is a section on line 4—4 Figure 3.

Figure 5 is a section on line 5—5 Figure 4.

Figure 1:
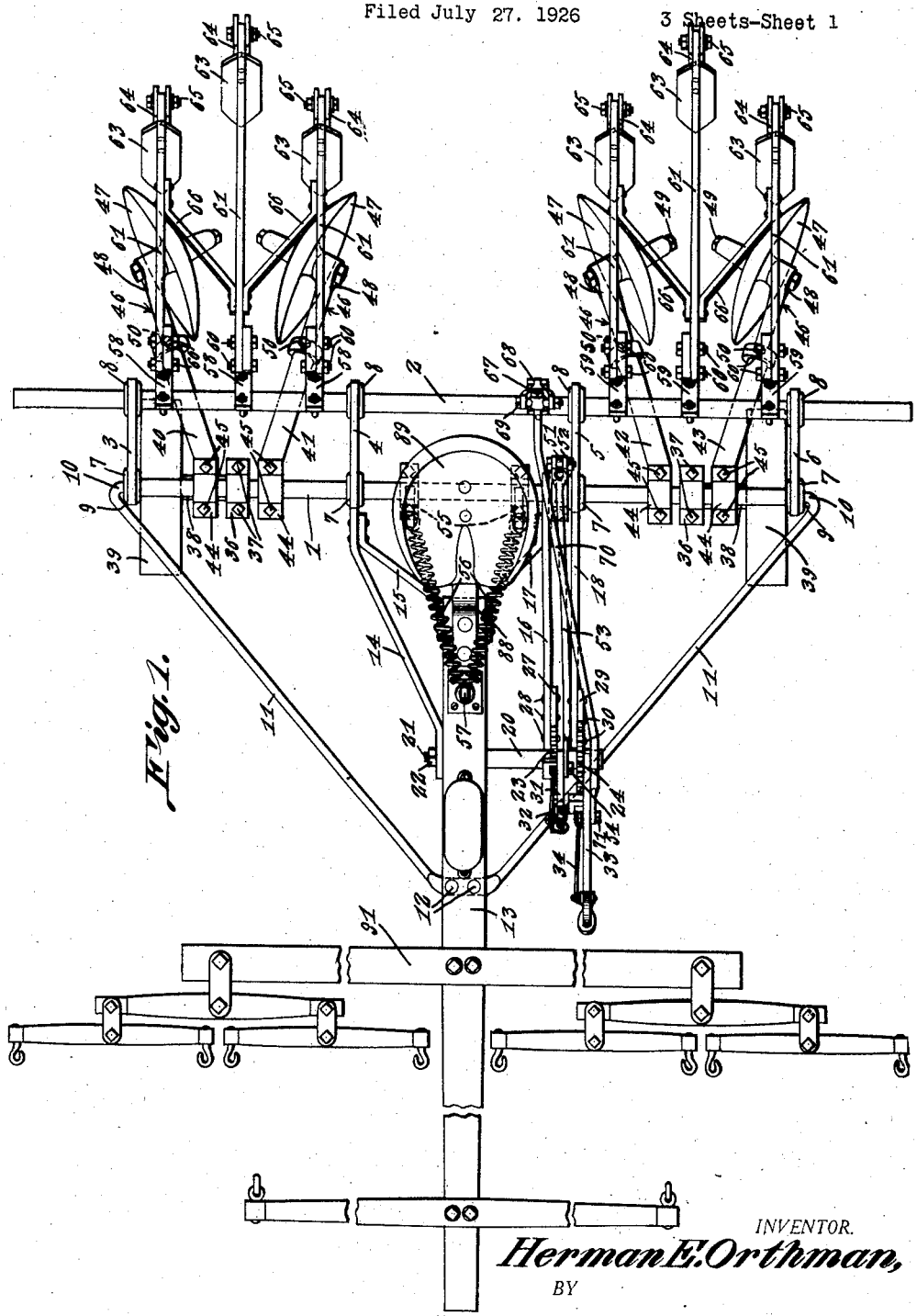
Figure 1 is a top plan view, of a cultivator in accordance with this invention.

Referring to the drawings in detail 1 denotes a forward and 2 a rearward supporting bar of polygonal cross section. The bars 1 and 2 are arranged in parallelism but spaced from each other and the bar 2 is of greater length than the bar 1 and arranged to project laterally with respect to the ends of the bar 1. The bars 1 and 2 are shiftably supported to provide for the elevating and lowering of ground working devices, to be hereinafter referred to and which are carried by said bars. The ground working devices carried by the bar 1 are arranged in advance of the ground working devices carried by the bar 2. The ground working devices carried by the bar 1 are in the form of cultivator disks and the ground working devices carried by the bar 2 are in the form of shovels. The manner of connecting the disk and shovels to the supporting bars will be hereinafter more specifically referred to.

The bars 1 and 2 are connected together, and maintained in spaced relation by a series of coupling members 3, 4, 5 and 6 which are substantially spaced from each other. Shiftably mounted in each end of a coupling member is a bushing, plug or collar hereinafter termed a collar. The collars at the forward ends of the coupling members are indicated at 7 and those at the rear end at 8. The collars mounted in the coupling members 4 and 5 have the inner faces thereof conform to the contour of the rods 1 and 2 whereby when said rods are shifted such collars will be bodily carried therewith within the coupling members and provide for the rods shifting on their longitudinal axes. The collars 7 mounted in the forward ends of the coupling members 3 and 6 have their inner faces of a contour corresponding to the ends of the rod 1 so that said collars 7 will be bodily carried with the rod 1 when the latter is shifted, and the said collars 7 are furthermore provided in a manner so that a portion of the inner faces thereof will be of cylindrical contour, as at 9, Figure 1, to permit of the collars shifting upon the inturned ends 10, of the forwardly extending and inwardly inclined brace rods, 11 which have their forward ends, secured as at 12 against the lower face of the draft tongue 13, which is disposed perpendicular to the supporting rods 1 and 2. The rear end of the tongue 13 is spaced from the bar 1. The coupling member 4 is provided with an extension 14 which abuts against and is secured to one side of the tongue 13. Interposed between the tongue 13, and the extension 14, as well as being fixedly secured therewith is a brace member 15. Carried by the bar 1 and projecting forwardly therefrom is a supporting member 16 and interposed between the latter and the tongue 13 as well as being secured to the tongue and the member 16, is a brace member 17. The coupling member 5 is formed with a forward extension 18 which is arranged below but spaced from the member 16.

The coupling member 5 further includes a depending reinforcing web 19 which is integral with the forward and rear ends of said member 5 and the said extension 18 projects forwardly from the web 19. Extending transversely through the tongue 13 and projecting from one side thereof is a shaft 20 having a reduced threaded part 21 upon which is mounted a securing nut 22. The reduced part 21 extends through the tongue 13 and also through the extension 14 and the securing nut 22 is employed for binding the extension 14 against the tongue 13 as well as for securing the shaft 20 to the tongue 13. Fixed upon the shaft 20 is a pair of upstanding racks 23, 24 of arcuate contour. The racks are provided at the upper edge with a pair of quadrant-shaped bodies or members 25, 26. The member 25 is formed at its bottom with a rearwardly directed arm 27 which is fixedly secured, by the hold fast devices 28 to the supporting member 16. The member 26 is formed at its bottom with a rearwardly directed arm 29, which is fixedly secured by the hold fast devices 30 to the extension 18. The member 16 and extension 18 provide braces for the quadrant-shaped members 26 and 27. Shiftably mounted on the shaft 20 is a hand operated lever 31 carrying a lever operated locking pawl device 32 which associates with the rack 23 for the purpose of maintaining the lever 31 in the position to which it has been adjusted. Shiftably mounted on the shaft 20 is a hand operated lever 33 carrying a lever operated locking pawl device 34 which associates with the rack 24 for the purpose of maintaining the lever 33 in the position to which it has been adjusted. The lever 31 is provided for shifting the supporting bars for the purpose of elevating and lowering the ground working devices carried thereby and the lever 33 is employed for shifting the supporting bar 2 for the purpose of elevating and lowering the ground working devices carried thereby. The connections between the levers 31 and 33 with the bars 1 and 2 respectively will be presently referred to.

Depending from the supporting bar 1 is a pair of hangers 35 and each of which is secured to the bar 1 by a clamping member 36 and hold fast devices 37. The hangers 35 are of L-shaped contour and arranged whereby the lower portion thereof will project in a lateral direction, as indicated at 38, Figure 1 and towards an end of the bar 1. The lateral or angularly disposed portion 38 of each hanger carries a supporting wheel 39, see Figure 1. Extending rearwardly from the bar 1 and below the bar 2 is a series of carriers for cultivator disks. The carriers are arranged in pairs and each pair positioned between the transverse center and one end of the bar 1. The carriers of one pair are indicated at 40, 41 and the carriers of the other pair at 42, 43. The carriers of each pair extend at a downward inclination and further incline in opposite directions with respect to each other. The inclination of the carrier 40 corresponds to the inclination of the carrier 42 and the inclination of the carrier 41 corresponds to the inclination of the carrier 43. Each carrier is tubular and has its upper end abutting against the bar 1. The upper ends of the carriers are secured to the bar 1, so as to be bodily movable therewith, by clamping members 44, in connection with the hold fast devices 45. Each hanger 35 is positioned between the upper ends of a pair of carriers. Extending into the carriers and lengthwise adjustable with respect thereto, as well as capable of being revolved within the carriers, is an angle-shaped support 46 for a cultivator disk 47. The disks 47 are revolubly mounted upon the lower ends of the supports 46. As shown each of the supports consist of a bar 48, having connected therewith an angularly disposed shaft 49 for the disk 47. The supports 46 are revolved in the carriers for the purpose of setting the disks at any desired angular disposition. When the disks 47 have been adjusted, they are maintained in such position by set screws 50 which are mounted at the lower ends of the carriers and bind against the rods 48. The disks 47 which are supported from the carriers 40, 41 are oppositely disposed with respect to each other and a like arrangement is had of the disks 47 supported from the carriers 42, 43. The disks are adjusted in one direction for the purpose of throwing the soil outwardly. The disks are elevated and lowered when the supporting bar 1 is shifted by the lever 33 and for such purpose the supporting bar 1 is provided with a crank arm 51 which is pivotally connected as at 52, to a pull bar 53, pivotally connected as at 54 to the lower end of the lever 31. The connection between the hangers 35 and the supporting bar 1 is such as to permit of the bar 1 shifting in such connection. The supporting bar 1 is furthermore provided with a pair of upstanding arms 55, and to each of which is connected the rear end of a coil spring 56. The forward ends of the coil spring 56 are connected to a lug 57 which is carried by the tongue 13. The springs 56 are employed for lightening the load on the lever 31.

Connected to and bodily movable with the supporting bar 2, as well as projecting rearwardly therefrom at an angle, is a series of coupling devices arranged in sets, each set consists of three coupling devices and two sets of coupling devices are employed. One set is arranged between the coupling members 3 and 4 and the other set between the coupling members 5 and 6. The coupling devices of one set are indicated at 58 and the coupling devices of the other set at 59. The coupling devices of each set are equally spaced with respect to each other. Secured to each coupling device, by the hold fast devices 60 is a rearwardly extending shank 61 having a depending and forwardly curved rear portion 62 to which is adjustably connected a shovel 63. The shovels 63 are carried by connecting brackets 64 which are adjustably secured as at 65 to the shank 61 and which permits of the shovels to be adjusted to any desired inclination. The intermediate shank 61 of the series of shanks of each set projects rearwardly with respect to the outer shanks of the set. See Figure 1. The intermediate shank is connected to the outer shank of each set by brace members 66. The shovels 63 are arranged rearwardly with respect to the disks 47. The sets of shovels are bodily carried with the supporting bar 2 when the latter are shifted and the shifting of the bar 2 is had through the medium of a crank arm 67 which is connected to the bar 2 as at 68 and has its upper end pivotally connected as at 69 to a pull rod 70, which is pivotally connected as at 71, to the lever 33. When the lever 33 is shifted in one direction the sets of shovels are lowered and when shifted in the other direction the sets of shovels are elevated.

In lieu of employing the intermediate shovel of each set, a shield is substituted therefor and which is positioned between the outer shovels. The shield is shown in Figures 3, 4 and 5 and indicated at 72 and is provided for shielding the growing corn. The shield is of appropriate height and of inverted yoke shape and carries two pair of oppositely extending straps 73, which are secured by the hold fast devices 74 to a connecting bar 75, which has an upstanding forwardly inclined yoke-shaped forward portion 76, provided with openings 77 for selectively receiving a shaft 78 carrying a roller 79 travelling on a rearwardly extending and downwardly inclined track 80, which terminates in an upstanding rear portion 81 constituting a stop for the roller 79. The portion 76 of the bar 75 straddles the track 80 see Figure 5. The track 80 is formed from a bar of metallic material of substantial length, and which has its rear portion secured to a bar 82 by the hold fast devices 83. The bar 82 at its rear end is provided with a hook 84, to which is detachably connected the upper end of a chain 85 the latter having its lower end loosely connected as at 86 to the rear end of the shield 72. The bar which forms the track 80 is furthermore secured against the lower face of the supporting bar 2 by the hold fast devices 87 which also act to secure the forward end of the bar 82 upon the upper face of the supporting bar 2. The setting up of the shield 72 in the manner as stated prevents breaking of the same when meeting with an obstruction, as when the shield 72 meets with an obstruction it will be forced rearwardly on the track 80 until it reaches the portion 81, and the chain 85 will then act, in connection with the roller 79 to swing the rear end of the shield upwardly or rather swing the shield upwardly until it passes the obstruction. The shield 72 is elevated and lowered on the shifting movement of the bar 2 simultaneously with the disks 47 and the shovels. When the shield 72 is employed in lieu of the intermediate shovel of each set, the said intermediate shovel and its connection with the supporting bar 2 and with the outer shanks are removed.

Secured to the rear end of the tongue 13 is an upstanding seat post 88 provided at its top with a seat 89. The tongue 13 carries a tool box 90. The tongue 13 can be provided with a hitch for long doubletree and a hitch for a short doubletree. The long doubletree hitch is indicated at 91.

The shovels operate between the disks. When the shield is employed it operates between the disks and the shovels. When cultivating the first time over the corn, the soil is thrown outwardly, the second time over the corn the soil is thrown inwardly. The third time over, the tongue is over the corn row. The first time over it requires a different hitch, as the tongue goes between the two rows of corn instead of over the corn row. The horses spread over one blank row of corn, settling the two carrying or traction wheels against the outside band of corn which holds them firm the second time in the same manner but throws the soil in. Setting the shovels out leaves a small trench between the corn rows. The third time over the corn the traction or carrying wheels are set to follow the small trenches. The third time over, the hitch is different as the tongue is arranged over the corn row.

It is thought the many advantages of a one unit two row lister cultivator in accordance with this invention can be readily understood, and although the preferred embodiment of the invention is as illustrated and described, yet it is to be understood that changes in the details of construction can be had which will fall within the scope of the invention as claimed.

What I claim is:

1. A cultivator comprising a pair of spaced, parallel, supporting bars each shiftable on its longitudinal axis and one arranged in advance of the other, a series of spaced parallel coupling members for said bars, a front and a rear shiftable supporting collar mounted in each of said members, said forward bar corresponding in contour to the inner faces of the forward collars and extending through these latter, said rear bar corresponding in contour to the inner faces of the rear collars and extending through these latter, said collars shifting bodily with said bars, a pair of hangers, each fixedly secured to the forward bar in proximity to an end thereof and movable upon an arc when the forward bar is shifted on its longitudinal axis, cultivator disks supported from and rearwardly of said forward bar and vertically adjusted thereby when said bar is shifted on its longitudinal axis, spaced shovels arranged rearwardly of the disks and supported from and rearwardly of said rear bar and vertically adjusted by the latter when it is shifted on its longitudinal axis, a supporting wheel mounted on each hanger and bodily carried therewith when its associated hanger is shifted on an arc, each of said bars provided intermediate its ends with an upstanding crank arm, a link and lever mechanism connected to the crank arm on the forward bar to provide for the shifting of such bar to elevate and lower said disks and shovels synchronously, and a link and lever mechanism connected directly to the crank on the rear bar for shifting the latter to elevate and lower said shovels independently of said disk.

2. A cultivator constructed in accordance with claim 1, a pair of upstanding arms carried by the forward bar, and anchored controlling springs connected to said pair of arms.

3. A cultivator attachment constructed in accordance with claim 1, shield supports extending rearwardly from said rear bar and bodily movable therewith, and means for adjustably, slidably and pivotally connecting a shield to a shield support, said shield supports adjustable by said forward and rear bars.

4. A cultivator constructed in accordance with claim 1, a draft tongue connected with the inner of said coupling members, and bracing means between the outer of said coupling members and said tongue.

5. A cultivator including a portable support, a connecting member including a track, said member fixedly secured to and extending rearwardly from said support and further including a hook at its rear end, a pivotal and slidable shield, coupling means mounted on said track, and a lengthwise adjustable shield connecting means engaging with said hook.

6. In a cultivator a portable support, a coupling device fixedly secured to said support and projecting rearwardly therefrom, a rearwardly extending shank secured to said device and formed with a depending and forwardly curved rear portion, a shovel connecting bracket mounted against said forwardly curved rear portion and formed at its top with slots, and means extending through said slots and forwardly curved rear portion for adjustably connecting the bracket to the shank, said bracket mounted for adjustment upwardly and angularly with respect to the forwardly curved rear portion of the shank.

In testimony whereof I affix my signature hereto.

HERMAN E. ORTHMAN.